(12) United States Patent
Troncone et al.

(10) Patent No.: US 10,263,437 B1
(45) Date of Patent: Apr. 16, 2019

(54) TABLETOP MOBILE DEVICE RECHARGER

(71) Applicants: Frederick R. Troncone, Rockville, MD (US); Arman Generoso Troncone, Bethesda, MD (US); Christopher Michael Arkwright, Erie, PA (US)

(72) Inventors: Frederick R. Troncone, Rockville, MD (US); Arman Generoso Troncone, Bethesda, MD (US); Christopher Michael Arkwright, Erie, PA (US)

( * ) Notice: Subject to any disclaimer, the term of this patent is extended or adjusted under 35 U.S.C. 154(b) by 41 days.

(21) Appl. No.: 14/576,184

(22) Filed: Dec. 18, 2014

(51) Int. Cl.
  *H02J 7/00* (2006.01)
  *G06Q 50/06* (2012.01)
  *G06Q 30/02* (2012.01)
  *H04B 5/00* (2006.01)
  *H02J 7/02* (2016.01)

(52) U.S. Cl.
  CPC ........ *H02J 7/0027* (2013.01); *G06Q 30/0284* (2013.01); *G06Q 50/06* (2013.01); *H02J 7/0004* (2013.01); *H02J 7/007* (2013.01); *H02J 7/0052* (2013.01); *H02J 7/025* (2013.01); *H04B 5/0037* (2013.01); *H02J 2007/0062* (2013.01); *H02J 2007/0096* (2013.01)

(58) Field of Classification Search
  CPC ...................................................... H02J 7/025
  See application file for complete search history.

(56) References Cited

U.S. PATENT DOCUMENTS

| | | | |
|---|---|---|---|
| 8,421,407 B2* | 4/2013 | Johnson | H02J 5/005 108/65 |
| 2007/0029965 A1* | 2/2007 | Hui | H01F 38/14 320/112 |
| 2009/0096413 A1* | 4/2009 | Partovi | H01F 5/003 320/108 |
| 2010/0207771 A1* | 8/2010 | Trigiani | B60L 11/1816 340/636.1 |
| 2011/0187318 A1* | 8/2011 | Hui | H02J 17/00 320/108 |
| 2014/0253032 A1* | 9/2014 | Bruwer | H02J 7/025 320/108 |

* cited by examiner

*Primary Examiner* — Yalkew Fantu
(74) *Attorney, Agent, or Firm* — Richard K. Thomson

(57) ABSTRACT

A tabletop mobile device recharging station is capable of simultaneously recharging a plurality of electronic devices including laptops, mobile phones, and tablets. A plurality of retractable power harnesses enable recharging through USB cables by transmission of a variable quantity of electrical energy following compliance with a predetermined condition, i.e., payment of a fee. The recharging station is also capable of wireless recharging and direct conversion of AC to appropriate levels of DC current to effect recharging.

10 Claims, 6 Drawing Sheets

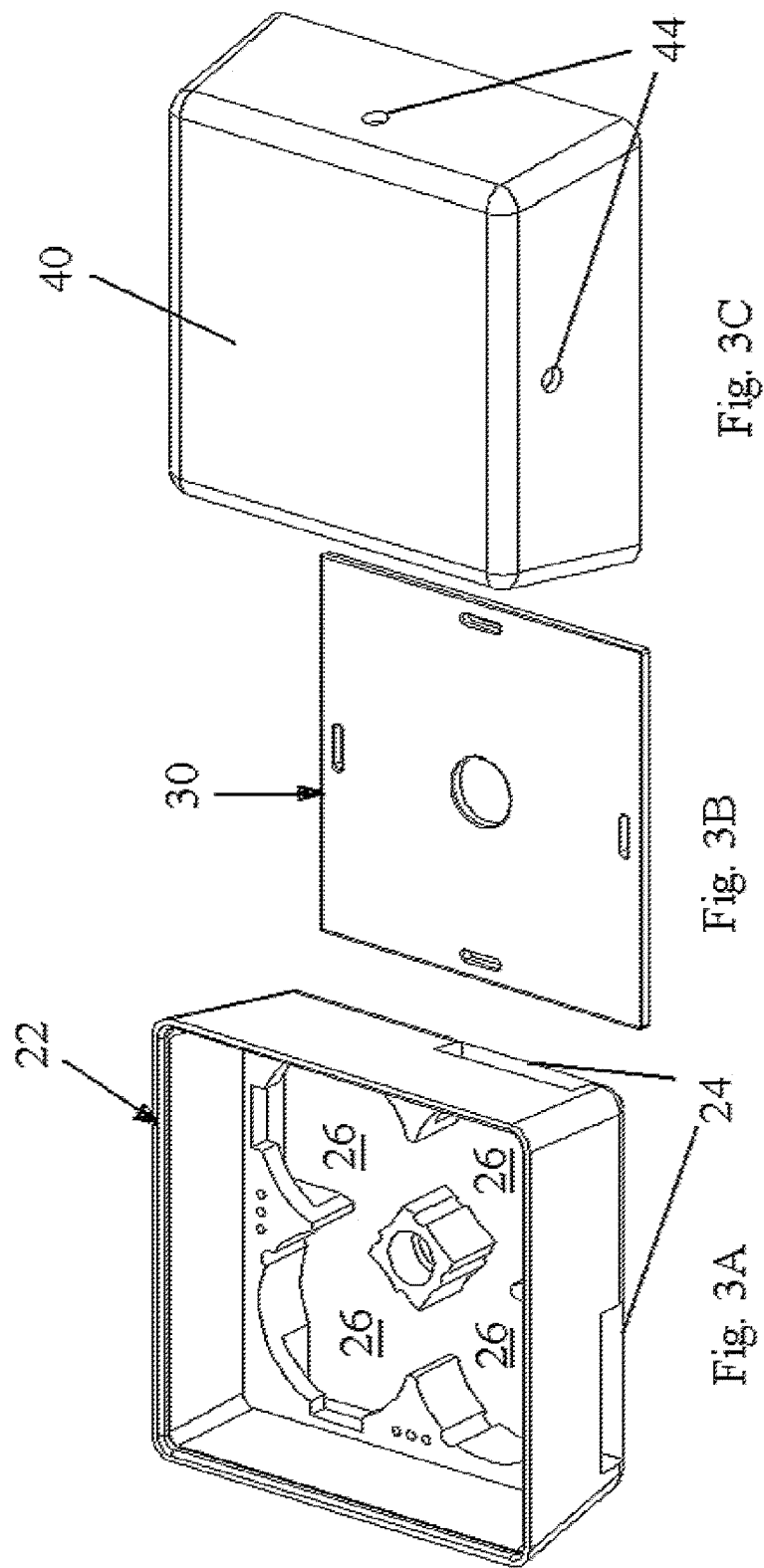

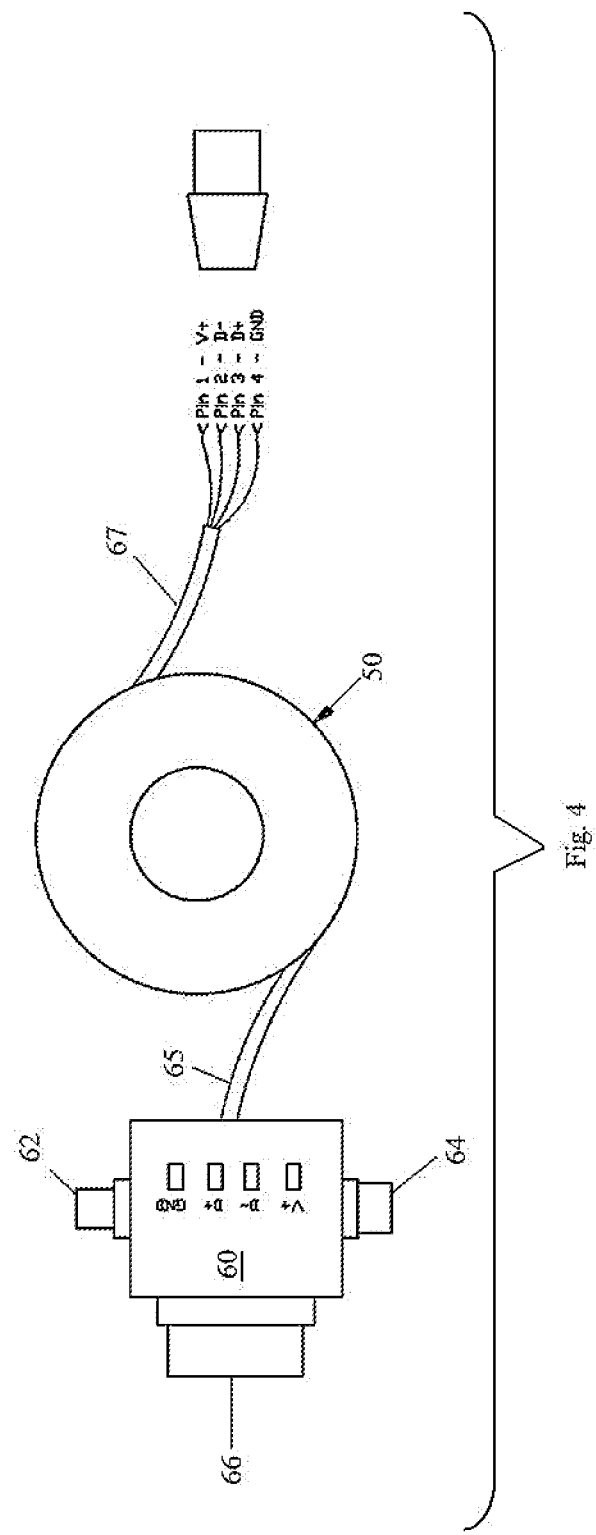

TABLETOP MOBILE DEVICE RECHARGER

The present invention claims priority from provisional patent application ser. no. 61/917603 filed Dec. 18, 2013.

BACKGROUND AND SUMMARY OF THE INVENTION

The present invention is directed to a tabletop recharging station for mobile devices.

Our culture is becoming increasingly dependent upon our wireless gadgets, cell phones, tablets, laptops, etc., and since we are constantly on the go, it frequently happens that we find ourselves out of battery away from home or other convenient charging location. It is among the objects of the present invention to provide a mobile device recharger which can be installed at any desired location such as a airport/bus terminal, library, restaurant or other commercial establishment. Connection to the recharger will be made with a USB cable which transmits both power and data. The circuit board installed within the mobile recharger can be activated by payment information submitted by the user or may be activated after the user has watched an ad/infomercial, in which case, the expense/fee associated with the electrical recharging will be born by the advertiser. As a third alternative, the end user may complete a questionnaire/survey where, once again, the cost/fee is paid by the commercial entity authorizing the survey. The recharging station will also be capable of wireless recharging by virtue of an induction coil contained therein which will be activated by either of the three methods utilized with the cable recharging.

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals and in which

FIG. 3A is top perspective view of the bottom element of the recharging station;

FIG. 3B is top perspective view of the intermediate mounting plate;

FIG. 3C is top perspective view of the top element of the recharging station;

FIG. 4 schematic depiction of the power harness retractor of the present invention;

DETAILED DESCRIPTION OF THE PREFERRED EMBODIMENT(S)

Figure 1:
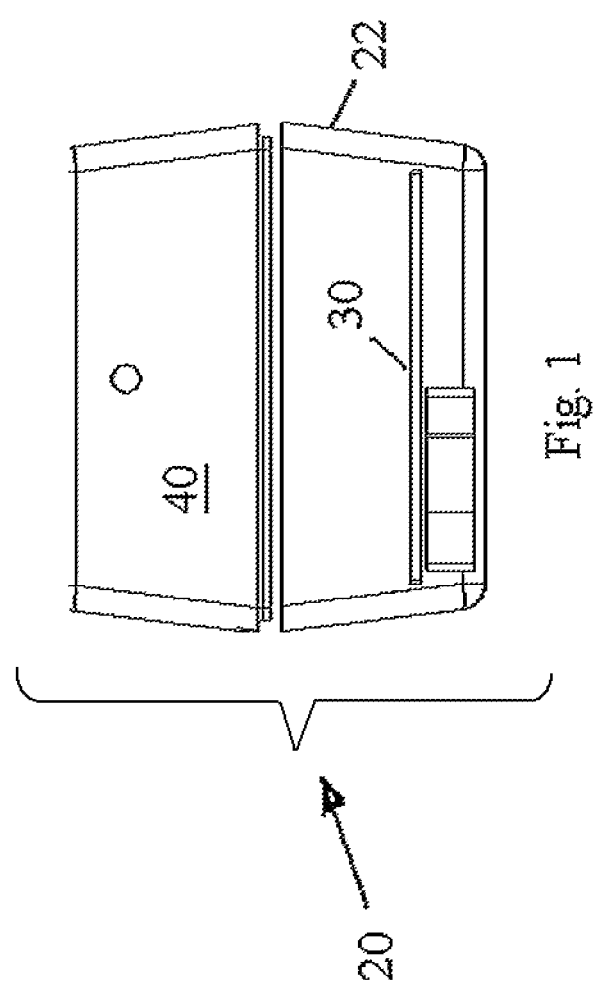
FIG. 1 is a partially exploded front view of a first embodiment of the tabletop mobile device recharging station of the present invention.
Figure 2C:
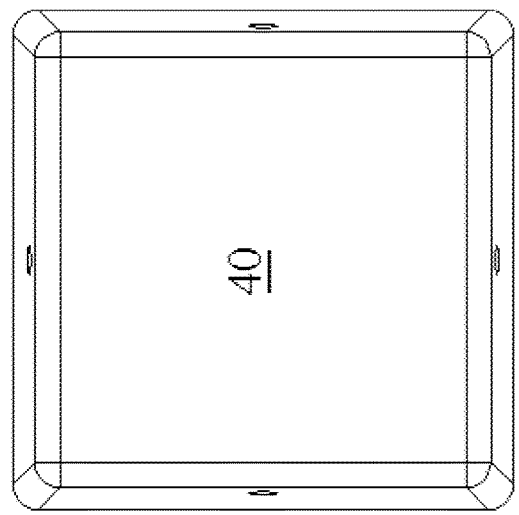
FIG. 2C is a side view of the top element of the recharging station.
Figure 2B:
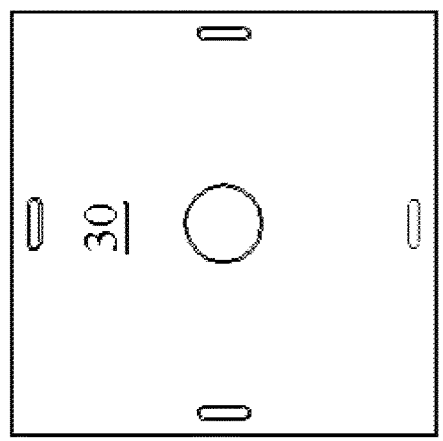
FIG. 2B is a side view of the intermediate mounting plate.
Figure 2A:
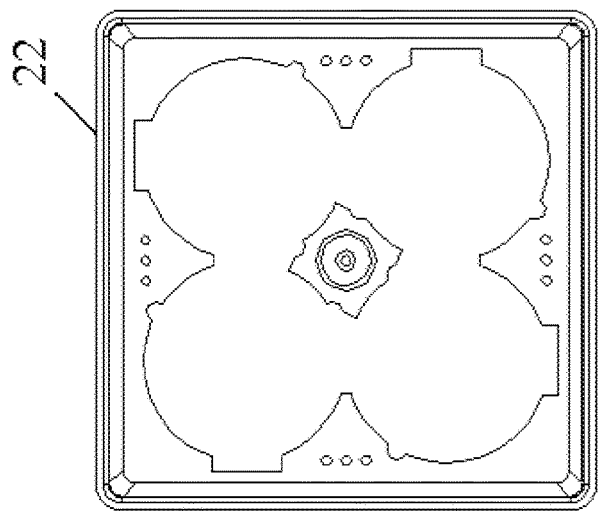
FIG. 2A is a side view of the bottom element of the recharging station.

A first embodiment of the tabletop mobile device recharging station of the present invention is depicted in FIG. 1 generally at 20. Recharging station 20 is made up of a bottom element 22, an intermediate attachment plate 30 to which the microprocessor/circuit board (not shown) is attached, and a top element 40.

Figure 5A:
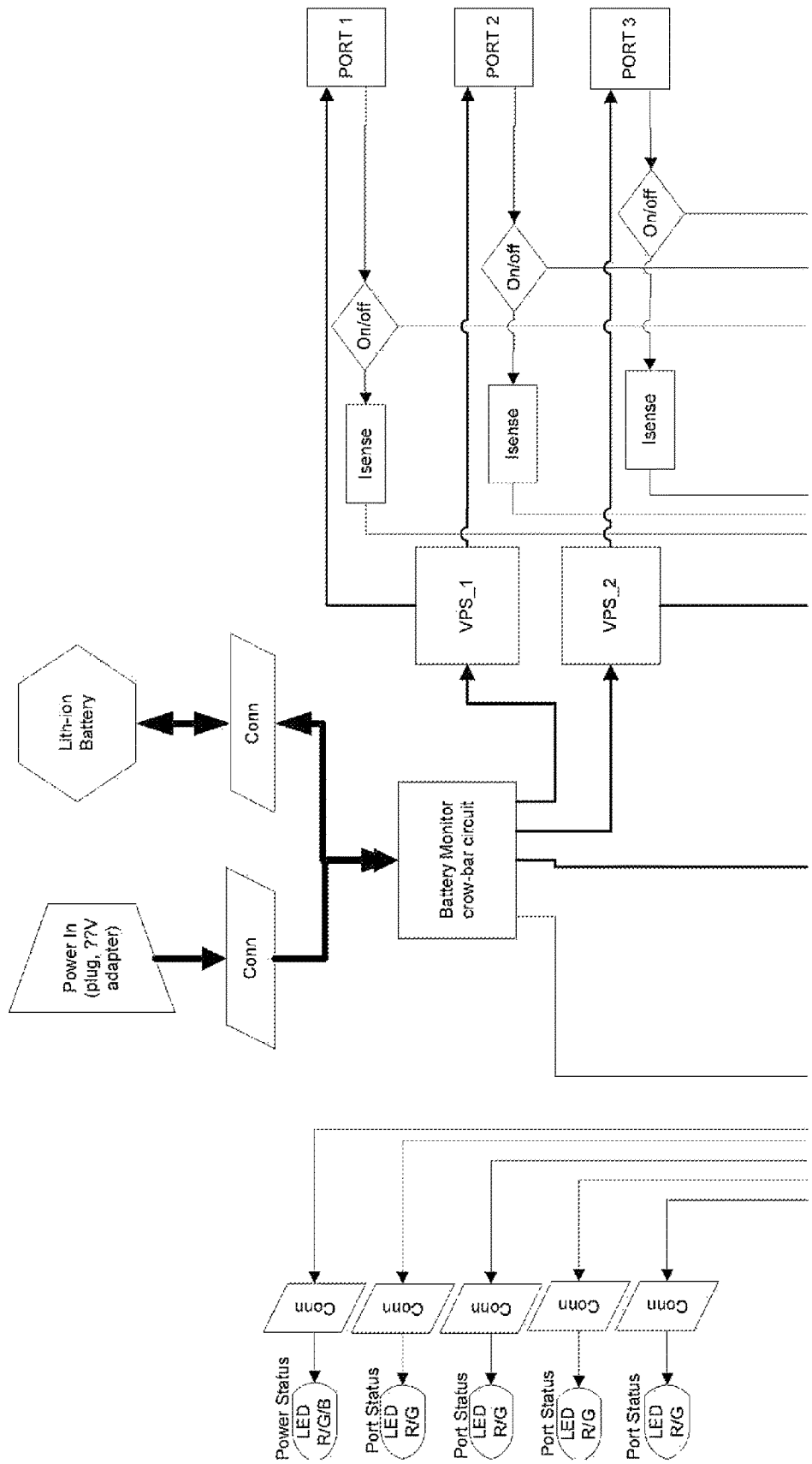
FIG. 5A is the top half of an electrical schematic of the recharging station; and, FIG. 5B is the bottom half of the electrical schematic depicted in FIG. 5A.
Figure 5B:
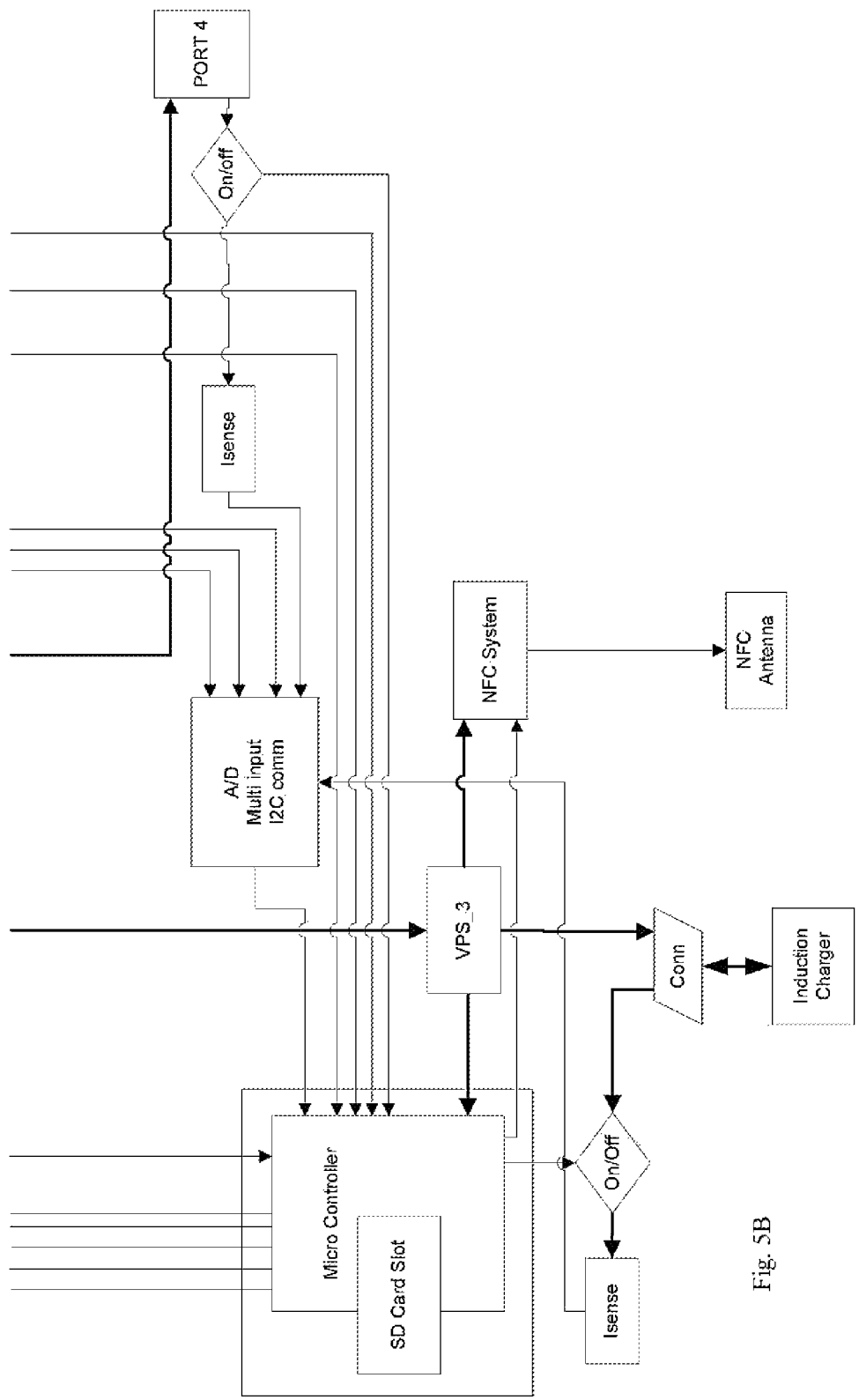

As best seen in FIGS. 3A-3C, bottom element 22 has an access port 24 on each of its four sides and four cavities 26 which each receive a power harness retractor 50 (FIG. 4). Power cable 65 is equipped with a multiport power/data connector 60 which allows fixed quantities of electrical energy to be transmitted from recharging station 20 and two data communication to/from the mobile devices from/to the recharging station 20. As depicted in FIG. 4, the upper port 62 is of a type used to connect an iPad 5/6 via a lightning pin, the lower port 64 is a micro USB port, and the port 66 is of the type used to connect an iPhone or tablet. Obviously, power/data connector 60 could have any of a number of other configurations. Between the intermediate attachment plate 30 and top element 40 is a lithium ion battery (FIG. 5A), induction charger (FIG. 5B) and a AC/DC transformer. For devices equipped to be recharged wirelessly, the device will be placed in proximity to the recharging station 20 (e.g., laid on top, where practical) once authorization has been obtained. Top element 40 has an opening 44 on each side associated with each of access ports 24 and connectors 60. An LED light will be positioned in each of the openings 44 and communicate information about its respective connector 60 (solid light means the connector 60 is operative, light out means not available to charge, and flashing means in the process of charging the device).

The separate wires of cable 67 are connected to microprocessor/circuit board (not shown) via a universal serial bus. A proprietary software application "Aercharge" associated with the circuit board and downloaded to the mobile device will interact to verify that a predetermined condition has been met to permit dispensing of a variable quantity of electrical energy (in accordance with the needs of the device and time allotment available to the user). The software application will permit WiFi connection, Bluetooth, or near field communication (nfc) to identify the user and enable credit card payment, if the charging station 20 is equipped for "payment mode" or the display of an infomercial if the charging station 20 is operating in "ad mode". These ads may be of a national variety or, more preferably, may reflect localized, geographically relevant ads or infomercials regarding events taking place (i.e., time sensitive displays). Lastly, the gate keeper software may permit charge activation following the completion of a survey by the end user when the firmware is configured to operate in the "survey mode".

Various changes, alternatives, and modifications will become apparent to a person of ordinary skill in the art after a reading of the foregoing specification. It is intended that all such changes, alternatives, and modifications as fall within the scope of the appended claims be considered part of the present invention.

We claim:

1. A tabletop mobile device recharging station for supplying a battery of any of a variety of mobile devices with a fixed quantity of electrical energy for enabling its operation, said tabletop mobile recharging station comprising:
   a) a compact housing;
   b) electrical dispensing means associated with the housing for permitting the fixed quantity of electrical energy to be transferred to the battery of at least one mobile device;
   c) software associated with said housing acting as a gate keeper for said electrical dispensing means, releasing a variable quantity of electrical energy upon compliance with a predetermined condition, said predetermined condition including payment of a predetermined amount of money, said predetermined amount varying with an amount of energy to be dispensed;

d) a storage battery for dispensing electrical energy;

e) at least one power harness engageable between said storage battery and a mobile electronic device creating a hardwire connection there between capable of transmitting both electrical power and data, said data transmission including payment information for a user.

2. The tabletop mobile device recharging station of claim 1 wherein said power harness has a plurality of outlets capable of connection to a variety of various sized transmission cables.

3. The tabletop mobile device recharging station of claim 2 further comprising a plurality of power harnesses associated with said housing to enable simultaneous recharging of a plurality of mobile devices.

4. The tabletop mobile device recharging station of claim 3 wherein each of said power harnesses is retractable.

5. The tabletop mobile device recharging station of claim 1 wherein said predetermined condition comprises viewing an infomercial prior to receiving a variable quantity of electrical energy.

6. The tabletop mobile device recharging station of claim 1 wherein said predetermined condition comprises completion of a survey prior to receiving a variable quantity of electrical energy.

7. The tabletop mobile device recharging station of claim 1 wherein dispensing means comprises an induction coil to wirelessly transmit the fixed quantity of electrical energy to the at least one mobile device.

8. The tabletop mobile device recharging station of claim 1 further comprising a transformer to convert AC input current to appropriate levels of DC output current to recharge the at least one mobile device.

9. The tabletop mobile device recharging station of claim 1 wherein said software allows verification of user identity and gate keeper compliance through a means selected from the group consisting of WiFi connection, Bluetooth, and near field communication (nfc).

10. A tabletop mobile device recharging station for supplying a battery of any of a variety of mobile devices with a fixed quantity of electrical energy for enabling its operation, said tabletop mobile recharging station comprising:

a) a compact housing;

b) electrical dispensing means associated with the housing for permitting the fixed quantity of electrical energy to be transferred to the battery of at least one mobile device;

c) software associated with said housing acting as a gate keeper for said electrical dispensing means, releasing a variable quantity of electrical energy upon compliance with a predetermined condition, said predetermined condition including each of
  i) payment of a predetermined amount of money,
  ii) watching a commercial ad provided by a sponsor;
  iii) completion of a survey provided by a sponsor;

d) a storage battery for dispensing electrical energy;

e) at least one power harness engageable between said storage battery and a mobile electronic device creating a hardwire connection there between capable of transmitting both electrical power and data.

\* \* \* \* \*